US009978387B1

(12) United States Patent
Pogue et al.

(10) Patent No.: US 9,978,387 B1
(45) Date of Patent: May 22, 2018

(54) REFERENCE SIGNAL GENERATION FOR ACOUSTIC ECHO CANCELLATION

(71) Applicant: Amazon Technologies, Inc., Seattle, WA (US)

(72) Inventors: Michael Alan Pogue, Sunnyvale, CA (US); Amit Singh Chhetri, Santa Clara, CA (US)

(73) Assignee: Amazon Technologies, Inc., Seattle, WA (US)

(*) Notice: Subject to any disclaimer, the term of this patent is extended or adjusted under 35 U.S.C. 154(b) by 125 days.

(21) Appl. No.: 13/959,377

(22) Filed: Aug. 5, 2013

(51) Int. Cl.
*G10L 21/02* (2013.01)

(52) U.S. Cl.
CPC .................................... *G10L 21/02* (2013.01)

(58) Field of Classification Search
CPC ........... H04B 3/20; H04B 15/00; G10L 15/20; G10K 11/16
USPC ........................................................ 704/226
See application file for complete search history.

(56) References Cited

U.S. PATENT DOCUMENTS

| 7,418,392 | B1 | 8/2008 | Mozer et al. | |
| 7,720,683 | B1 | 5/2010 | Vermeulen et al. | |
| 7,774,204 | B2 | 8/2010 | Mozer et al. | |
| 8,064,617 | B2* | 11/2011 | Buck | H04R 3/005 381/122 |
| 8,180,069 | B2* | 5/2012 | Buck | H04R 3/005 381/92 |
| 8,184,801 | B1* | 5/2012 | Hamalainen | H04M 9/08 379/406.03 |
| 2004/0059571 | A1* | 3/2004 | Ohtomo | H04M 9/082 704/226 |
| 2008/0101622 | A1* | 5/2008 | Sugiyama | 381/66 |
| 2009/0089053 | A1* | 4/2009 | Wang | G10L 25/78 704/233 |
| 2012/0123773 | A1* | 5/2012 | Zeng | G10L 21/0208 704/226 |
| 2012/0223885 | A1 | 9/2012 | Perez | |
| 2012/0316872 | A1* | 12/2012 | Stoltz | G10L 21/0216 704/233 |
| 2013/0190041 | A1* | 7/2013 | Andrews | H04R 3/005 455/556.1 |

FOREIGN PATENT DOCUMENTS

WO    WO2011088053 A2    7/2011

OTHER PUBLICATIONS

Pinhanez, "The Everywhere Displays Projector: A Device to Create Ubiquitous Graphical Interfaces", IBM Thomas Watson Research Center, Ubicomp 2001, Sep. 30-Oct. 2, 2001, 18 pages.

* cited by examiner

*Primary Examiner* — Shreyans Patel
(74) *Attorney, Agent, or Firm* — Lee & Hayes, PLLC

(57) ABSTRACT

An audio device may have an output speaker that produces audio within the environment of a user and one or more input microphones that capture speech and other sounds from the user environment. The audio device may use acoustic echo cancellation (AEC) to suppress echoed components of the speaker output that may be present in audio captured by the input microphones. The AEC may be implemented using an adaptive filter that estimates echoing based on an output reference signal. The output reference signal may be generated by a reference microphone placed near the speaker of the audio device.

24 Claims, 4 Drawing Sheets

REFERENCE SIGNAL GENERATION FOR ACOUSTIC ECHO CANCELLATION

BACKGROUND

Echo cancellation (AEC) is used in telecommunications devices to improve audio quality. In this environment, an echo or echo component is a delayed reoccurrence of an original signal in a received or retransmitted signal. For example, a device may be used to produce audio as well as to receive speech input from a user. Received audio containing user speech may also contain echoed components of the output audio, which may confuse speech processing components. AEC is particularly useful in so-called "hands-free" communications devices, where there is very little acoustic isolation between the microphone and speaker of the device.

BRIEF DESCRIPTION OF THE DRAWINGS

The detailed description is described with reference to the accompanying FIGURES. In the FIGURES, the left-most digit(s) of a reference number identifies the FIGURE in which the reference number first appears. The use of the same reference numbers in different FIGURES indicates similar or identical components or features.

DETAILED DESCRIPTION

This disclosure pertains generally to an audio device having an output speaker that produces audio within the environment of a user and one or more input microphones that capture speech and other sounds from the user environment. The audio device uses acoustic echo cancellation (AEC) to suppress echoed components of the speaker output.

The AEC is implemented using an adaptive filter that estimates echoing based on an output reference signal. The output reference signal is generated by a reference microphone placed near the speaker of the audio device. Because the reference microphone is very near the speaker, the audio output of the speaker dominates the output reference signal in comparison to user speech or other environmental audio.

In some cases, the reference microphone may be isolated from ambient audio by placement within an enclosure or housing of the audio device. In some cases, the reference microphone may be further isolated within a sealed compartment of the housing and configured to pick up audio that is transmitted conductively through the housing.

Figure 1:
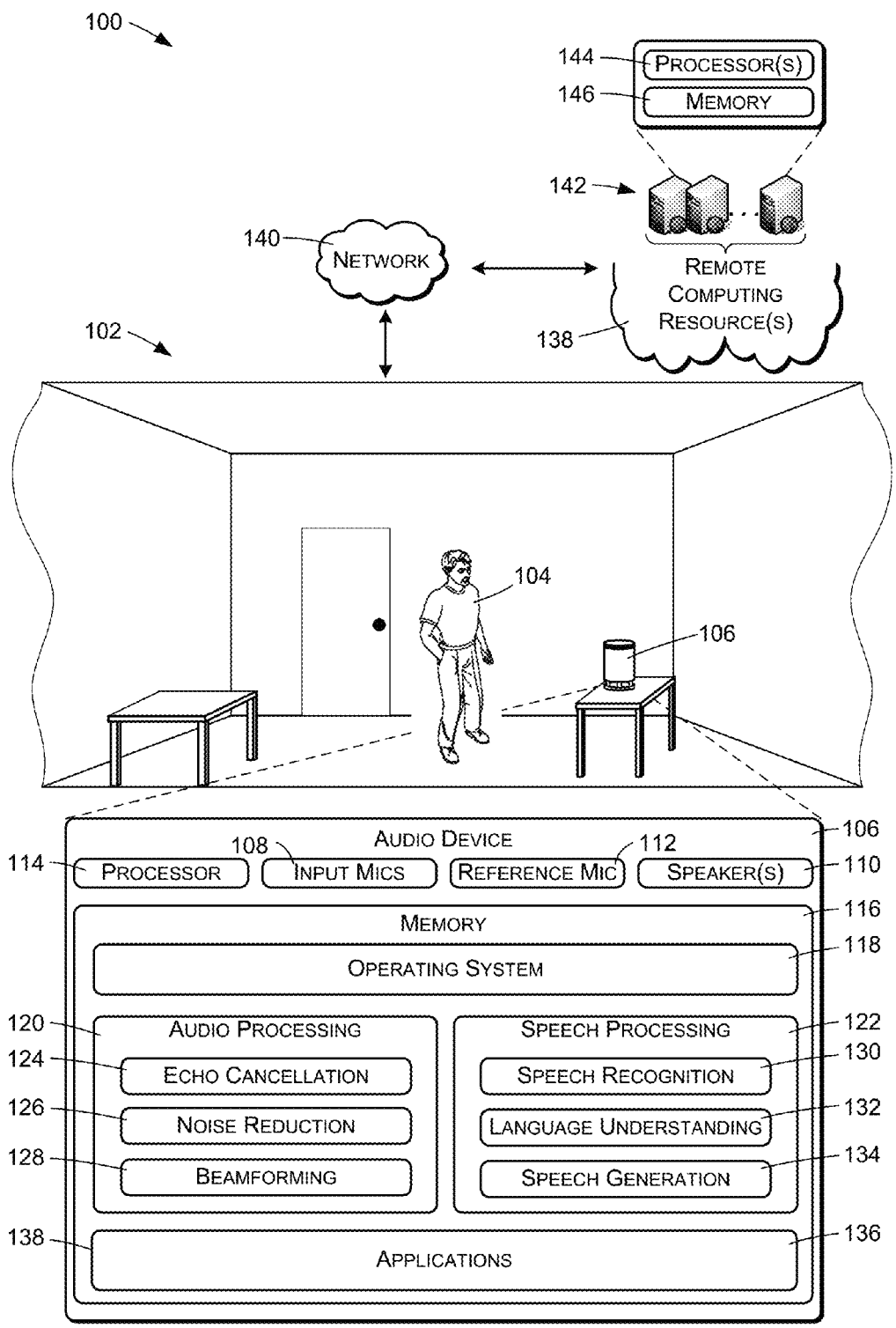
FIG. 1 is a block diagram of an example speech interface platform that includes a speech-based device.

FIG. 1 shows an example speech interface platform 100 in an environment 102, such as a home environment, that includes a user 104. The platform 100 includes an electronic, speech-based audio device 106 with which the user 104 may interact. In the illustrated implementation, the audio device 106 is positioned on a table within a room of the environment 102. In other implementations, it may be placed in any number of locations (e.g., ceiling, wall, in a lamp, beneath a table, under a chair, etc.). Furthermore, more than one audio device 106 may be positioned in a single room, or one audio device 106 may be used to accommodate user interactions from more than one room.

Generally, the audio device 106 may have one or more input microphones 108 and one or more speakers 110 to facilitate audio interactions with the user 104 and/or other users. The input microphones 108 of the audio device 106, also referred to herein as ambient microphones, produce audio signals representing ambient audio such as sounds uttered from the user 104 or other sounds within the environment 102. The audio signals produced by the ambient microphones 108 may also contain delayed audio components from the speaker 110, which may be referred to herein as echoes, echo components, or echoed components. Echoed audio components may be due to acoustic coupling, and may include audio components resulting from direct, reflective, and conductive paths.

The audio device may also include one or more reference microphones 112, which are used to generate one or more output reference signals. Such output reference signals may be used by AEC components, described in more detail below, to suppress echoed audio components that may otherwise be present in the audio signals generated by the input microphones 108.

The audio device 106 includes operational logic, which in many cases may comprise a processor 114 and memory 116. The processor 114 may include multiple processors and/or a processor having multiple cores. The memory 116 may contain applications and programs in the form of instructions that are executed by the processor 114 to perform acts or actions that implement desired functionality of the audio device 106. The memory 116 may be a type of computer storage media and may include volatile and nonvolatile memory. Thus, the memory 116 may include, but is not limited to, RAM, ROM, EEPROM, flash memory, or other memory technology.

The audio device 106 may have an operating system 118 that is configured to manage hardware and services within and coupled to the audio device 106. In addition, the audio device 106 may include audio processing components 120 and speech processing components 122.

The audio processing components 120 may include functionality for processing input audio signals generated by the input microphone(s) 108 and/or output audio signals provided to the speaker 110. As an example, the audio processing components 120 may include an acoustic echo cancellation or suppression component 124 for reducing acoustic echo generated by acoustic coupling between the microphone 108 and the speaker 110. The audio processing components 120 may also include a noise reduction component 126 for reducing noise in received audio signals, such as elements of audio signals other than user speech.

In some embodiments, the audio processing components 120 may include one or more audio beamforming components 128 to generate an audio signal that is focused in a direction from which user speech has been detected. More specifically, the beamforming components 128 may be responsive to a plurality of spatially separated microphones 108 to produce audio signals that emphasize sounds originating from different directions relative to the audio device 106, and to select and output one of the audio signals that is most likely to contain user speech.

The speech processing components 122 receive an input audio signal that has been processed by the audio processing components 120 and perform various types of processing in order to recognize user speech and to understand the intent expressed the speech. The speech processing components 122 may include an automatic speech recognition component 130 that recognizes human speech in an audio signal. The speech processing components 122 may also include a natural language understanding component 132 that is configured to determine user intent based on recognized speech of the user.

The speech processing components 122 may also include a text-to-speech or speech generation component 134 that converts text to audio for generation by the speaker 110.

The audio device 106 may include a plurality of applications 136 that work in conjunction with other elements of the audio device 106 to provide services and functionality. The applications 136 may include media playback services such as music players. Other services or operations performed or provided by the applications 136 may include, as examples, requesting and consuming entertainment (e.g., gaming, finding and playing music, movies or other content, etc.), personal management (e.g., calendaring, note taking, etc.), online shopping, financial transactions, database inquiries, and so forth. In some embodiments, the applications may be pre-installed on the audio device 106, and may implement core functionality of the audio device 106. In other embodiments, one or more of the applications 136 may be installed by the user 104, or otherwise installed after the audio device 106 has been initialized by the user 104, and may implement additional or customized functionality as desired by the user 104.

In certain embodiments, the primary mode of user interaction with the audio device 106 is through speech. In an embodiment described herein, the audio device 106 receives spoken commands from the user 104 and provides services in response to the commands. For example, the user may speak predefined commands (e.g., "Awake"; "Sleep"), or may use a more casual conversation style when interacting with the audio device 106 (e.g., "I'd like to go to a movie. Please tell me what's playing at the local cinema."). Provided services may include performing actions or activities, rendering media, obtaining and/or providing information, providing information via generated or synthesized speech via the audio device 106, initiating Internet-based services on behalf of the user 104, and so forth.

In some instances, the audio device 106 may operate in conjunction with or may otherwise utilize computing resources 138 that are remote from the environment 102. For instance, the audio device 106 may couple to the remote computing resources 138 over a network 140. As illustrated, the remote computing resources 138 may be implemented as one or more servers or server devices 142. The remote computing resources 138 may in some instances be part of a network-accessible computing platform that is maintained and accessible via a network 140 such as the Internet. Common expressions associated with these remote computing resources 138 may include "on-demand computing", "software as a service (SaaS)", "platform computing", "network-accessible platform", "cloud services", "data centers", and so forth.

Each of the servers 142 may include processor(s) 144 and memory 146. The servers 142 may perform various functions in support of the audio device 106, and may also provide additional services in conjunction with the audio device 106. Furthermore, one or more of the functions described herein as being performed by the audio device 106 may be performed instead by the servers 142, either in whole or in part. As an example, the servers 142 may in some cases provide the functionality attributed above to the speech processing components 122. Similarly, one or more of the applications 136 may reside in the memory 146 of the servers 142 and may be executed by the servers 142.

The audio device 106 may communicatively couple to the network 140 via wired technologies (e.g., wires, universal serial bus (USB), fiber optic cable, etc.), wireless technologies (e.g., radio frequencies (RF), cellular, mobile telephone networks, satellite, Bluetooth, etc.), or other connection technologies. The network 140 is representative of any type of communication network, including data and/or voice network, and may be implemented using wired infrastructure (e.g., coaxial cable, fiber optic cable, etc.), a wireless infrastructure (e.g., RF, cellular, microwave, satellite, Bluetooth®, etc.), and/or other connection technologies.

Although the audio device is described herein as a voice-controlled or speech-based interface device, the techniques described herein may be implemented in conjunction with various different types of devices, such as telecommunications devices and components, hands-free devices, entertainment devices, media playback devices, and so forth.

Figure 2:
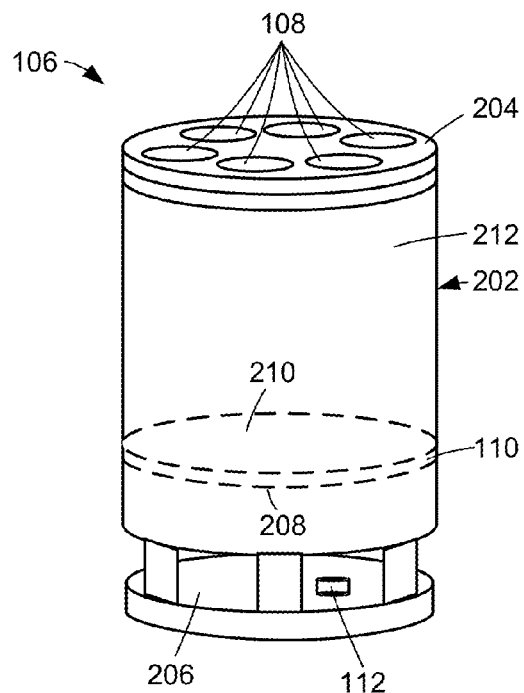
FIGS. 2 and 3 are perspective diagrams of example audio devices that incorporate reference microphones.

FIG. 2 illustrates an example embodiment of the audio device 106. In this embodiment, the audio device 106 comprises cylindrical housing 202 for the input microphones 108, speaker 110, reference microphone 112, and other supporting components. The input microphones 108 are laterally spaced from each other so that they can be used by the audio beamforming components 128 to produce directional audio signals. In the illustrated embodiment, the input microphones 108 are positioned in a circle or hexagon on a top surface 204 of the housing 202.

In various embodiments, the input microphones 108 may include greater or less than the number of microphones shown. For example, an additional microphone may be located in the center of the top surface 204 and used in conjunction with peripheral microphones for producing directionally focused audio signals.

The speaker 110 may be positioned within and toward the bottom of the housing 202, and may be configured to emit sound omnidirectionally, in a 360 degree pattern around the audio device 106. For example, the speaker 110 may comprise a round speaker element directed downwardly in the lower part of the housing 202, to radiate sound radially through an omnidirectional opening or gap 206 in the lower part of the housing 202.

More specifically, the speaker 110 in the described embodiment has a front or front side 208 that faces down and that is open to the environment. The speaker 110 has a back side 210 that faces up and that is not open to the environment. The housing 202 may form a closed or sealed space or chamber 212 behind the speaker 110.

In some embodiments, the speaker 110 may have a directional audio output pattern that is designed to generate sound from the front of the speaker 110. The area in front of or below the speaker is within the directional output pattern and the area behind or above the speaker 110 is outside the directional output pattern.

FIG. 2 illustrates one of many possible locations of the reference microphone 112. In this embodiment, the reference microphone 112 is positioned below or substantially in front of the speaker 110, within or substantially within the directional output pattern of the speaker 110. The reference microphone 112 is further positioned in close proximity to the speaker 110 in order maximize the ratio of speaker-generated audio to user speech and other ambient audio. To further increase this ratio, the reference microphone 112 may comprise a directional or unidirectional microphone, with a directional sensitivity pattern that is directed upwardly toward the front of the speaker 110. In some embodiments, the reference microphone 112 may comprise a directional proximity microphone, designed to emphasize sounds originating from nearby sources while deemphasizing sounds that originate from more distant sources.

The input microphones 108, on the other hand, are positioned above or substantially behind the speaker 110, without or substantially without its directional output pattern. In addition, the distance from the input microphones 108 to the speaker 110 is much greater than the distance from the reference microphone 112 to the speaker 110. For example, the distance from the input microphones 108 to the speaker 110 may be from 6 to 10 inches, while the distance from the reference microphone to the speaker may be from 1 to 2 inches.

Because of the relative orientation and positioning of the input microphones 108, the speaker 110, and the reference microphones 112, audio signals generated by the input microphones 108 are relatively less dominated by the audio output of the speaker 110 in comparison to the audio signal generated by the reference microphones 112. More specifically, the input microphones 108 tend to produce audio signals that are dominated by user speech and other ambient audio, while the reference microphone 112 tends to produce an audio signal that is dominated by the output of the speaker 110. As a result, the relative magnitude of speaker-generated output audio to user-generated speech audio is greater in the reference audio signal produced by the reference microphone 112 than in the input audio signals produced by the input microphones 108.

Figure 3:
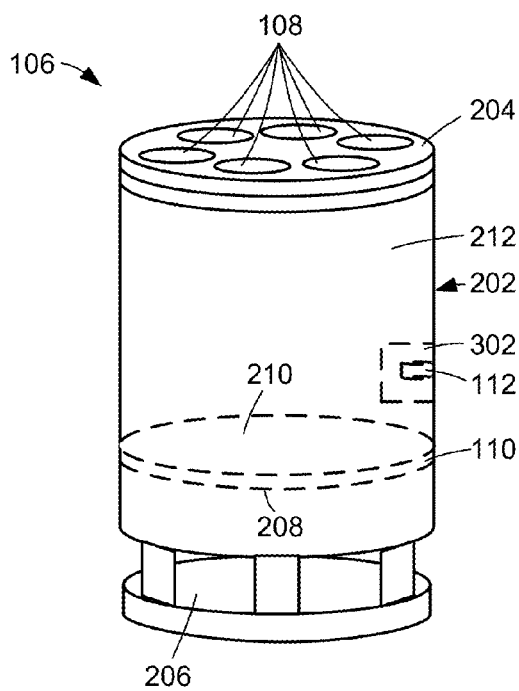

FIG. 3 illustrates another possible location of the reference microphone 112. In this embodiment, the reference microphone 112 is positioned in the closed or sealed space 212 formed by the housing 202 behind the speaker 110. The reference microphone 112 may be attached to a side wall of the housing 202 in order to pick up audio that is coupled through the closed space 212 of the housing 202 and/or to pick up audio that is coupled conductively through the walls or other structure of the housing 202. Placement of the reference microphone 112 within the closed space 212 serves to insulate the reference microphone 112 from ambient sound, and to increase the ratio of speaker output to ambient sound in audio signals generated by the reference microphone 112. In some embodiments, the reference microphone 112 may be further isolated within a sealed chamber 302 within the housing 202, in order to emphasize speaker-generated audio that is conducted through the housing 202 itself.

FIGS. 2 and 3 are examples of many different microphone and speaker arrangements. In some cases, the speaker 110 may comprise multiple speaker drivers, such as high-frequency drivers (tweeters) and low-frequency drivers (woofers). Separate reference microphones may in some cases be provided for use in conjunction with such multiple speaker drivers.

The reference microphones may be of various types, including dynamic microphones, condenser microphones, optical microphones, proximity microphones, and various other types of sensors that may be used to detect the movement and/or audio output of the speaker 110.

Figure 4:
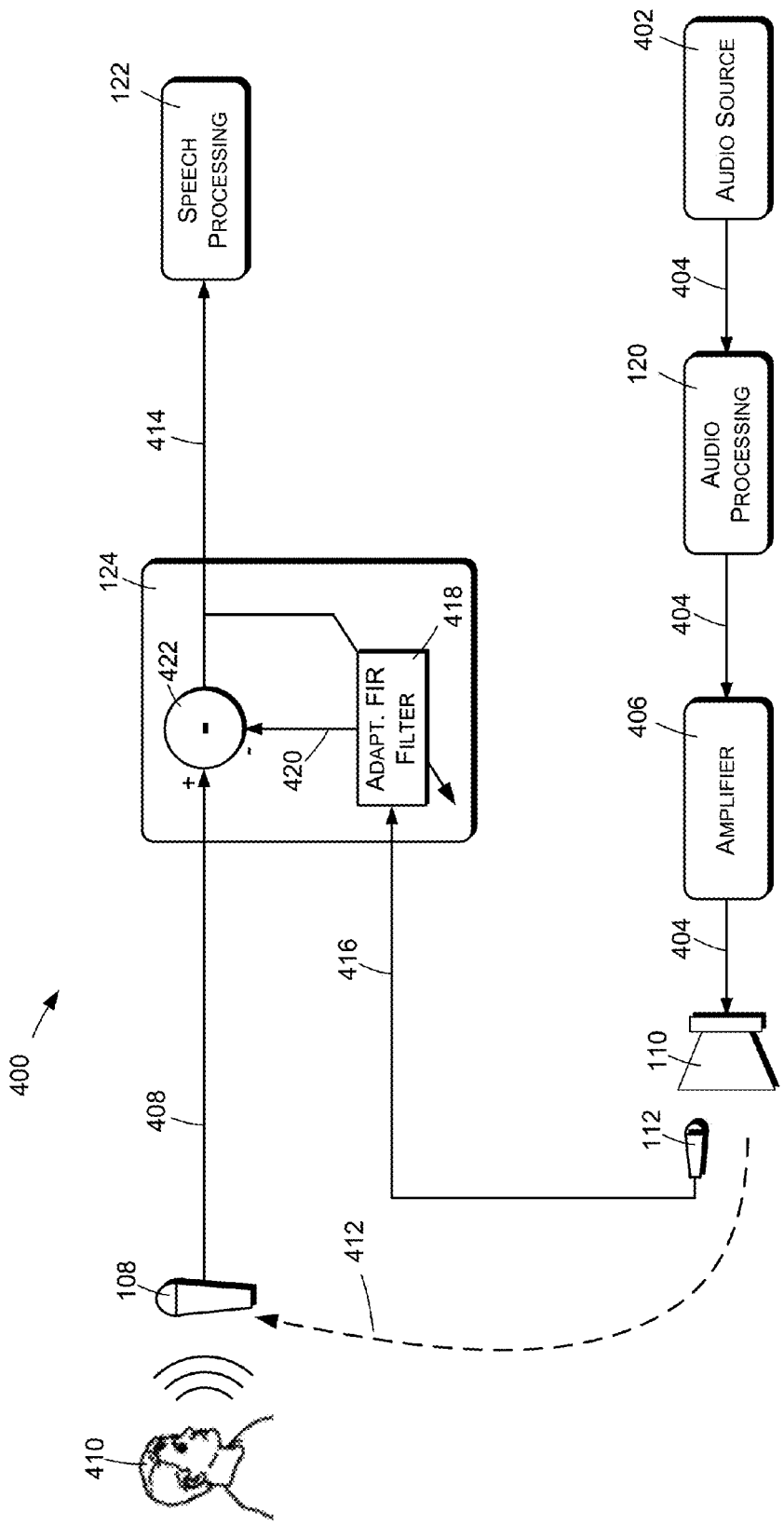
FIG. 4 is a block diagram illustrating an example implementation of acoustic echo cancellation using a reference signal generated by a reference microphone.

FIG. 4 illustrates an example 400 of acoustic echo cancellation (AEC) such as might be implemented by the audio device 106. An audio source 402 generates a receive-path audio signal 404 that is provided to the speaker 110. The receive-path audio signal 404 may processed by the audio processing components 120 and may be amplified by an amplifier 406 prior to being used to drive elements of the speaker 110.

The audio source 402 may comprise or may be part of one of the applications 136 as shown in FIG. 1, or may comprise an independent or external source.

The speaker 110 is responsive to the receive-path output audio signal 404 to produce audio within the user environment 102. The audio produced by the speaker 110 may potentially contain distortions, non-linearities or other variations in comparison to the receive-path output audio signal 404 due to factors such amplification, clipping, speaker imperfections, and so forth.

An input microphone 108 receives audio from the user environment 102 and produces a transmit-path input audio signal 408 that represents the received audio. Although only a single input microphone 108 is shown, the input audio signal 408 may be generated by receiving signals from multiple input microphones 108 and by performing techniques such as beamforming to produce a directional audio signal representing audio from a single direction relative to the audio device 106. More generally, the techniques illustrated by FIG. 4 may be used in conjunction with any type of input audio signal containing components that are echoed from a speaker.

The audio received by the input microphone 108 may include speech utterances of a user 410 as well as other ambient sounds and noise, and may also include echoed components resulting from audio that is generated by the speaker 110 and that reaches the input microphone 108 through one or more echo paths 412.

Various audio processing components may be used to process the input audio signal 408 in accordance with various design objectives. In the example of FIG. 4 only the echo cancellation component 124 is shown, although it should be understood that other components may also be used. For example, various types of noise suppression, beamforming, and other audio processing may be implemented either upstream or downstream of the echo cancellation component 124. Furthermore, although FIG. 4 illustrates a particular type of echo cancellation based on adaptive filtering, different echo cancellation techniques may also be used.

The echo cancellation component 124 produces an echo-suppressed audio signal 414, which comprises the input audio signal 408 after subtracting or suppressing echoed components of the input audio signal 408. The echo-suppressed audio signal 414 may be provided to the speech processing components 122. Speech-related information gathered or understood from the echo-suppressed audio signal 414 may be provided to the applications 136. The applications 136, as described above, may respond by providing services or performing actions.

The echo cancellation (AEC) component 124 receives the input audio signal 408 and a reference audio signal 416 generated by the reference microphone 112. The AEC component 124 is configured to cancel or suppress acoustic echo in the input audio signal 408, and to produce the echo-suppressed audio signal 414.

The reference audio signal 416 primarily contains output audio from the speaker 110 due to the physical proximity of the reference microphone 112 to the speaker 110. Although the reference audio signal 416 may also contain components of ambient noise and/or user speech, these components will be negligible in comparison to the speaker-produced audio.

In the described embodiment, the echo cancellation component 124 comprises an adaptive filter. More specifically, the echo cancellation component 124 comprises an adaptive finite impulse response (FIR) filter 418 and a subtraction component 422. The adaptive FIR filter 418 generates an estimated echo signal 420, which estimates one or more echo components of the input audio signal 408. The estimated echo signal 420 is subtracted from the input audio signal 408 by the subtraction component 422 to produce the echo-suppressed audio signal 414.

The adaptive FIR filter 418 estimates echo components by generating and repeatedly updating a sequence of coefficients and by applying the coefficients respectively to a sequence of most recently received samples of the input audio signal 408. The adaptive FIR filter 418 calculates and dynamically updates the coefficients so as to continuously and adaptively minimize the signal power of the echo-suppressed audio signal 414, which is referred to as the "error" signal in the context of adaptive filtering.

Figure 5:
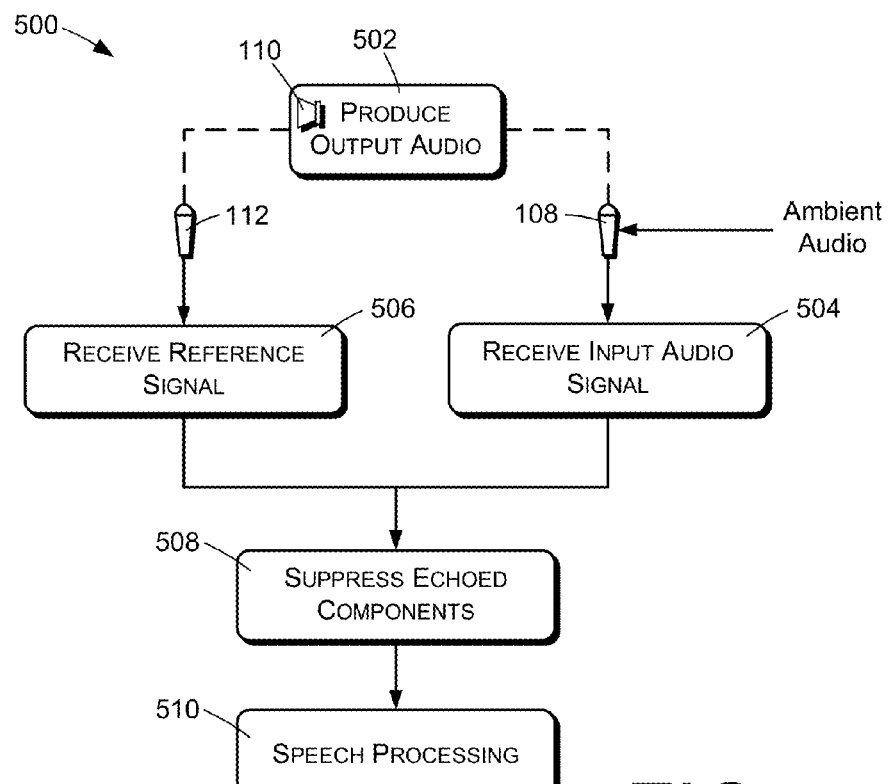
FIG. 5 is a flow diagram illustrating an example method for acoustic echo cancellation using a reference microphone.

FIG. 5 illustrates a method 500 that may be implemented by the speech interface platform 100 for echo cancellation or suppression. Although the method is described with reference to the elements and components of FIGS. 1-4, the method may also be implemented in other environments and in conjunction with other types of systems and devices.

An action 502 comprises generating or producing output audio with the speaker 110 in an environment such as a room. An action 504 comprises receiving an input audio signal 408 from the one or more input microphones 108. The received input audio signal may represent ambient audio. Ambient audio may include one or more echoed components of the output audio produced by the speaker 110, including delayed components of the output audio due to various types of acoustic coupling between the speaker 110 and the one or more input microphones 108. The input microphones 108 may be positioned behind and away from the speaker 110 so that audio from the speaker 110 does not dominate the reference input audio signal 408 in comparison to the output audio.

An action 506 comprises receiving the reference audio signal 416 from the reference microphone 112. The reference microphone 112 is positioned relative to the speaker 110 and the input microphones 108 to reduce or minimize reception of audio other than the output audio produced by the speaker 110. For example, the reference microphone may be positioned in front of and proximate the speaker 110 so that audio from the speaker 110 dominates the reference audio signal 416 generated by the reference microphone 112.

Generally, the microphones and speaker may be configured so that the output audio produced by the speaker 110 is relatively more prominent in the reference audio signal 416 than in the input audio signal 408. In some cases, this may be accomplished through relative positioning of the microphones. For instance, the one or more input microphones 108 may be positioned at least a first distance from the speaker 110 and the reference microphone 112 may be positioned within a second distance from the speaker 110, where the second distance is smaller than the first distance.

In some embodiments, the reference microphone 112 may be physically insulated or isolated from the ambient atmosphere to reduce reception of user speech and other ambient sound by the reference microphone 112. Also, the reference microphone 112 may be configured so that it is responsive to conduction of the output audio through a device housing or chassis. In some embodiments, the reference microphone 112 may be directional, and may have a directional sensitivity pattern that is directed toward and facing the directional audio output pattern of the speaker 110.

An action 508 comprises suppressing the one or more echoed components that may be present in the input audio signal 408, to produce the echo-suppressed output signal 410. In some embodiments, this may comprise estimating the echoed components of the output audio in the input audio signal 408 based at least in part on the reference audio signal 416 and the input audio signal 408. As an example, an adaptive filter such as an adaptive finite impulse response filter may be used to estimate echoed components that are present in the input audio signal 408.

An action 510 may comprise performing speech processing based on the echo-suppressed output signal 410. For example, the action 510 may comprise speech recognition and language understanding that are performed relative to the echo-suppressed output signal 410.

Figure 6:
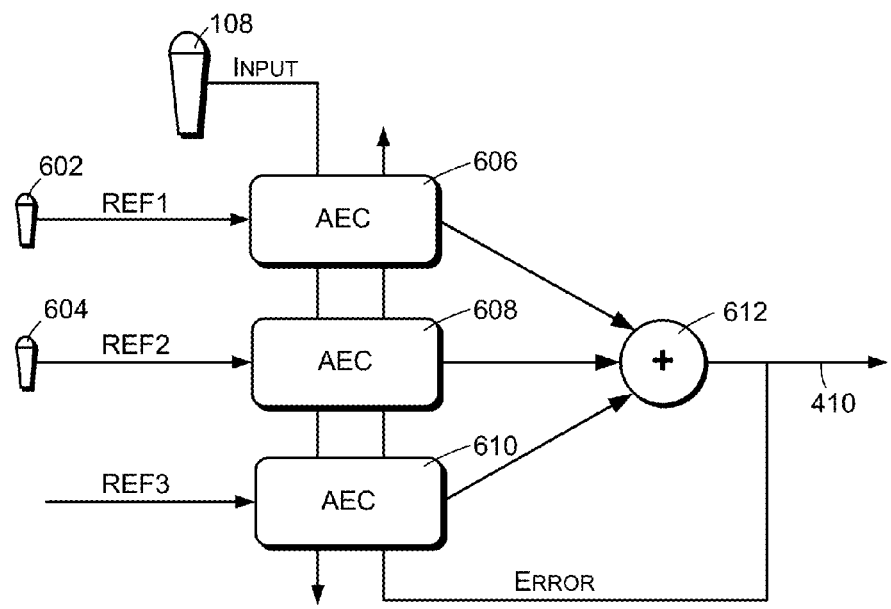
FIG. 6 is a block diagram illustrating an example implementation of acoustic echo cancellation using a plurality of reference signals, including reference signals generated by one or more reference microphones.

FIG. 6 illustrates an example implementation 600 in which acoustic echo cancellation is performed using multiple reference signals, including reference signals generated by multiple reference microphones. For example, a particular implementation may use two reference microphones 602 and 604, where the reference microphone 602 is positioned as shown in FIG. 2 and the reference microphone 604 is positioned as shown in FIG. 3. The two reference microphones 602 and 604 generate respective reference signals REF1 and REF2. In addition, a reference signal REF3 may comprise an audio signal that is used to drive the speaker 110, such as the receive-path audio signal 404.

Acoustic echo cancellation is performed on the input audio signal generated by the input microphone 108 by AEC components 606, 608, and 610, which correspond respectively to each of the reference signals REF1, REF2, and REF3. The AEC components may use adaptive filtering as described above to produce respective signals that are summed or averaged by a summing component 612. The echo-suppressed audio signal 410 comprises the summed or averaged outputs of the AEC components. The echo-suppressed audio signal 410 is fed back to the AEC components 606, 608, and 610, each of which uses the echo-suppressed audio signal 410 as the AEC error signal.

Generally, multiple reference microphones and/or reference signals may be used and/or combined by one or more AEC components in order to optimize echo cancellation. In some cases, various factors may be evaluated to determine one or more of multiple available reference signals that are likely to produce optimum results when used as the basis for AEC. In other cases, AEC may be performed in parallel based on different available reference signals, and the resulting echo-cancelled signals may be evaluated to identify which of the echo-cancelled signals demonstrates the best echo cancellation.

Although the subject matter has been described in language specific to structural features, it is to be understood that the subject matter defined in the appended claims is not necessarily limited to the specific features described. Rather, the specific features are disclosed as illustrative forms of implementing the claims.

The invention claimed is:
1. A speech interface system, comprising:
a housing;
a speaker positioned at least partly within the housing and configured to generate output audio based at least in part on an output audio signal;
one or more input microphones positioned to produce an input audio signal, the input audio signal representing user speech and one or more echoed components of the output audio from the speaker;
a reference microphone positioned within a compartment of the housing, the reference microphone to produce a reference audio signal, wherein a relative magnitude of the output audio to the user speech is greater in the reference audio signal than in the input audio signal, wherein the compartment is disposed at least partly between the speaker and the one or more input microphones;
an adaptive filter configured to produce an estimated echo signal representing the one or more echoed components of the output audio from the speaker as represented by the input audio signal, based at least in part on the reference audio signal;
a subtraction component configured to subtract the estimated echo signal from the input audio signal to produce an echo-suppressed audio signal; and
one or more speech processing components configured to perform speech recognition on the echo-suppressed audio signal.

2. The speech interface platform of claim 1, wherein the one or more input microphones are positioned behind the speaker.

3. The speech interface platform of claim 1, wherein the reference microphone is positioned closer to the speaker than the one or more input microphones.

4. The speech interface platform of claim 1, wherein the reference microphone is responsive to conduction of the output audio through one or more surfaces of the housing to generate the reference audio signal.

5. The speech interface platform of claim 1, further comprising a beam forming component configured to generate a directional input audio signal from the input audio signal.

6. The speech interface platform of claim 1, wherein the adaptive filter is configured to process the input audio signal and the reference audio signal.

7. The speech interface device of claim 1, wherein the reference microphone is positioned within the compartment such that the reference microphone is isolated from the user speech.

8. The speech interface device of claim 1, wherein a relative magnitude of the user speech to the output audio is greater in the input audio signal than in the reference audio signal.

9. The speech interface device of claim 1, further comprising:
an additional reference microphone positioned proximate to the speaker to produce an additional reference audio signal, wherein a relative magnitude of the output audio to the user speech is greater in the additional reference audio signal than in the input audio signal;
an additional adaptive filter configured to produce an additional estimated echo signal representing the one or more echoed components of the output audio from the speaker as represented by the input audio signal, based at least in part on the additional reference audio signal;
an additional subtraction component configured to subtract the additional estimated echo signal from the input audio signal to produce an additional echo-suppressed audio signal; and
a summing component configured to generate a summed echo-suppressed audio signal based at least in part on the echo-suppressed audio signal and the additional echo suppressed audio signal.

10. The speech interface device of claim 1, wherein:
the one or more microphones are configured to produce one or more audio signals for speech recognition; and
the reference microphone is configured to produce one or more reference audio signals for echo cancellation.

11. The speech interface device of claim 1, wherein:
the housing includes at least a first end and a second end;
the speaker is positioned at least partly within the housing such that the speaker includes a directional output pattern directed towards the second end of the housing; and
the reference microphone is disposed near the second end of the housing.

12. An audio device, comprising:
a housing;
a speaker positioned at least partly within the housing and configured to generate output audio;
one or more input microphones configured to produce an input audio signal, the input audio signal representing user speech and one or more echoed components of the output audio from the speaker;
a reference microphone positioned within a compartment of the housing such that the reference microphone is isolated from the user speech, the reference microphone configured to produce a reference audio signal, wherein a relative magnitude of the output audio to the user speech is greater in the reference audio signal than in the input audio signal, wherein the compartment is disposed at least partly between the speaker and the one or more input microphones;
an adaptive filter configured to produce, based at least in part on the reference audio signal, an estimated echo signal representing the one or more echoed components of the output audio from the speaker as represented by the input audio signal; and
an echo suppression element configured to suppress the one or more echoed components of the output audio as represented by the input audio signal using the estimated echo signal.

13. The audio device of claim 12, wherein the reference microphone is positioned closer to the speaker than the one or more input microphones.

14. The audio device of claim 12, wherein the reference microphone is responsive to conduction of the output audio through one or more surfaces of the housing to generate the reference audio signal.

15. The audio device of claim 12, wherein the compartment includes a sealed chamber of the housing.

16. The audio device of claim 12, further comprising a beam forming component configured to generate a directional input audio signal from the input audio signal.

17. The audio device of claim 12, wherein the reference microphone has a directional sensitivity pattern that is directed toward the speaker.

18. The audio device of claim 12, wherein the echo suppression element is configured to process the input audio signal and the reference audio signal.

19. The audio device of claim 12, wherein the speaker has a directional audio output pattern, the reference microphone is positioned outside of the directional audio output pattern, and the one or more input microphones are positioned outside the directional audio output pattern.

20. The audio device of claim 12, wherein the reference microphone is disposed at least partly on a surface of the housing and is responsive to conduction of the output audio through the surface to generate the reference audio signal.

21. A method, comprising:
- producing, using a speaker located at least partly within a housing, output audio based at least in part on an output audio signal;
- receiving an input audio signal from one or more input microphones, wherein the input audio signal represents user speech and one or more components of the output audio from the speaker;
- receiving a reference audio signal from a reference microphone that is positioned within a compartment of the housing, wherein a relative magnitude of the output audio to the user speech is greater in the reference audio signal than in the input audio signal, and wherein the compartment is disposed at least partly between the speaker and the one or more input microphones;
- generating, based at least in part on the reference audio signal, an estimated echo signal representing the one or more components of the output audio from the speaker as represented by the input audio signal; and
- suppressing the one or more components of the output audio as represented by the input audio signal based at least in part on the estimated echo signal.

22. The method of claim 21, wherein the one or more input microphones are positioned behind the speaker.

23. The method of claim 21, wherein the reference microphone is positioned closer to the speaker than the one or more input microphones.

24. The method of claim 21, wherein the reference microphone is positioned to reduce reception by the reference microphone of audio other than the output audio.

\* \* \* \* \*